US010549217B2

(12) United States Patent
Park et al.

(10) Patent No.: US 10,549,217 B2
(45) Date of Patent: Feb. 4, 2020

(54) FIBER FILTERING APPARATUS

(71) Applicant: DOOSAN HEAVY INDUSTRIES CONSTRUCTION CO., LTD., Changwon-si, Gyeongsangnam-do (KR)

(72) Inventors: Sung Won Park, Goyang-si (KR); Jung June Lee, Incheon (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 117 days.

(21) Appl. No.: 15/725,151

(22) Filed: Oct. 4, 2017

(65) Prior Publication Data
US 2018/0028945 A1 Feb. 1, 2018

Related U.S. Application Data

(63) Continuation of application No. PCT/KR2017/005846, filed on Jun. 5, 2017.

(30) Foreign Application Priority Data

Jun. 3, 2016 (KR) .................. 10-2016-0069324

(51) Int. Cl.
*B01D 24/46* (2006.01)
*B01D 39/04* (2006.01)
(Continued)

(52) U.S. Cl.
CPC ....... *B01D 24/4636* (2013.01); *B01D 24/007* (2013.01); *B01D 24/12* (2013.01);
(Continued)

(58) Field of Classification Search
CPC ...... B01D 24/007; B01D 24/12; B01D 24/40; B01D 24/4636; B01D 29/58; B01D 35/10;
(Continued)

(56) References Cited

U.S. PATENT DOCUMENTS 4,515,691 A * 5/1985 Ida .................. B01D 39/02
210/274
8,201,695 B2 * 6/2012 Kang ................ B01D 29/114
210/350

(Continued)

FOREIGN PATENT DOCUMENTS

DE 2002672 A1 * 9/1970 ........... B01D 24/008
JP 2013-000629 A 1/2013
(Continued)

Primary Examiner — Matthew O Savage
(74) Attorney, Agent, or Firm — Invenstone Patent, LLC

(57) ABSTRACT

A fiber filtering apparatus includes: an enclosure including an upper box and a lower box communicating with the upper box; a strainer installed in the upper box along a longitudinal direction; a plurality of fiber yarn media configured to be fixed to upper and lower fixing means each coupled to upper and lower parts of the strainer; a plurality of fiber ball media configured to be embedded in the lower box to form a second filtering layer; a first pipe configured to be formed on one side wall on the lower part of the upper box and introduced with raw water during filtration and drain backwashing water during backwashing; and a second pipe formed on one side wall on a lower part of the lower box and drain filtered water during the filtration and introduced with washing water during the backwashing.

19 Claims, 6 Drawing Sheets

(51) Int. Cl.
  *B01D 24/12*  (2006.01)
  *B01D 24/40*  (2006.01)
  *B01D 24/00*  (2006.01)
(52) U.S. Cl.
  CPC ............. *B01D 24/40* (2013.01); *B01D 39/04* (2013.01); *B01D 2201/087* (2013.01)
(58) Field of Classification Search
  CPC ............. B01D 39/04; B01D 2201/087; B01D 2201/186
  USPC ........................................................ 210/266
  See application file for complete search history.

(56) References Cited

U.S. PATENT DOCUMENTS

| 9,352,254 B2 * | 5/2016 | Lee | ........................ B01D 24/12 |
| 2017/0368482 A1 * | 12/2017 | Lee | ........................ B01D 35/10 |

FOREIGN PATENT DOCUMENTS

| KR | 100813114 B1 | 3/2008 |
| KR | 10-2013-0077611 A | 7/2013 |
| KR | 10-2015-0079193 A | 7/2015 |
| KR | 10-2016-0061173 A | 5/2016 |

\* cited by examiner

[FIG. 1]
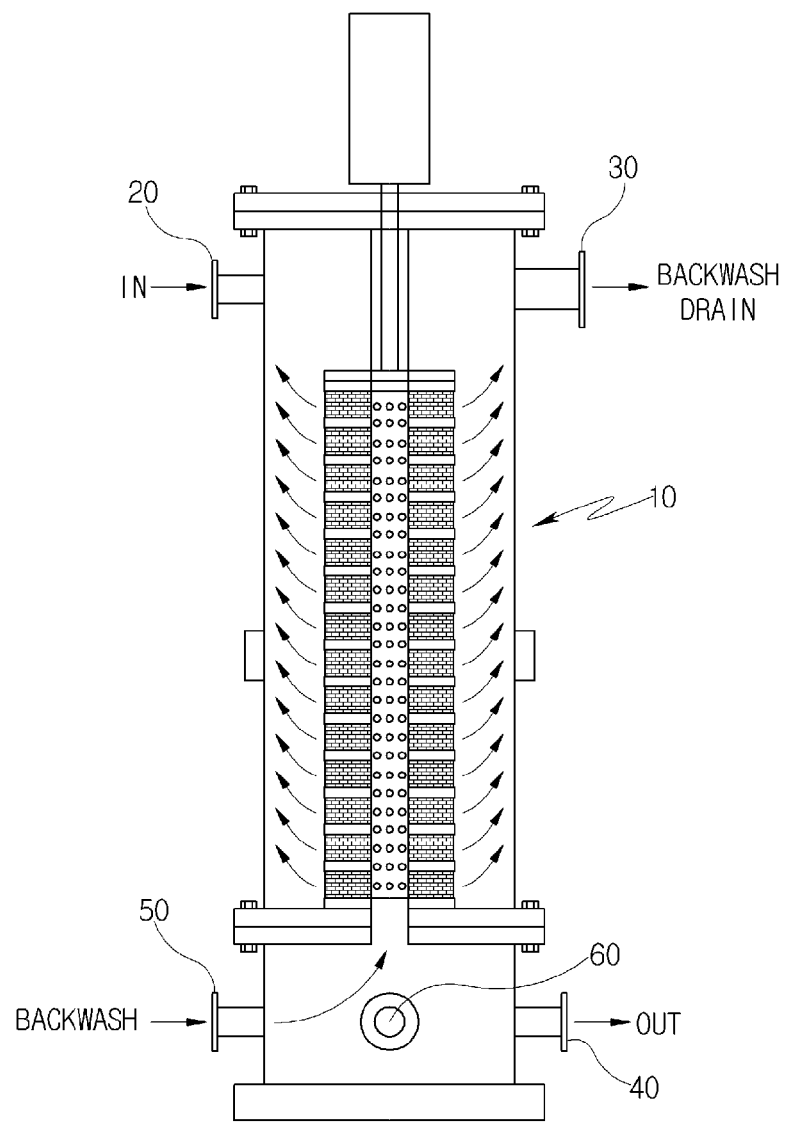
Prior Art

[FIG. 2]
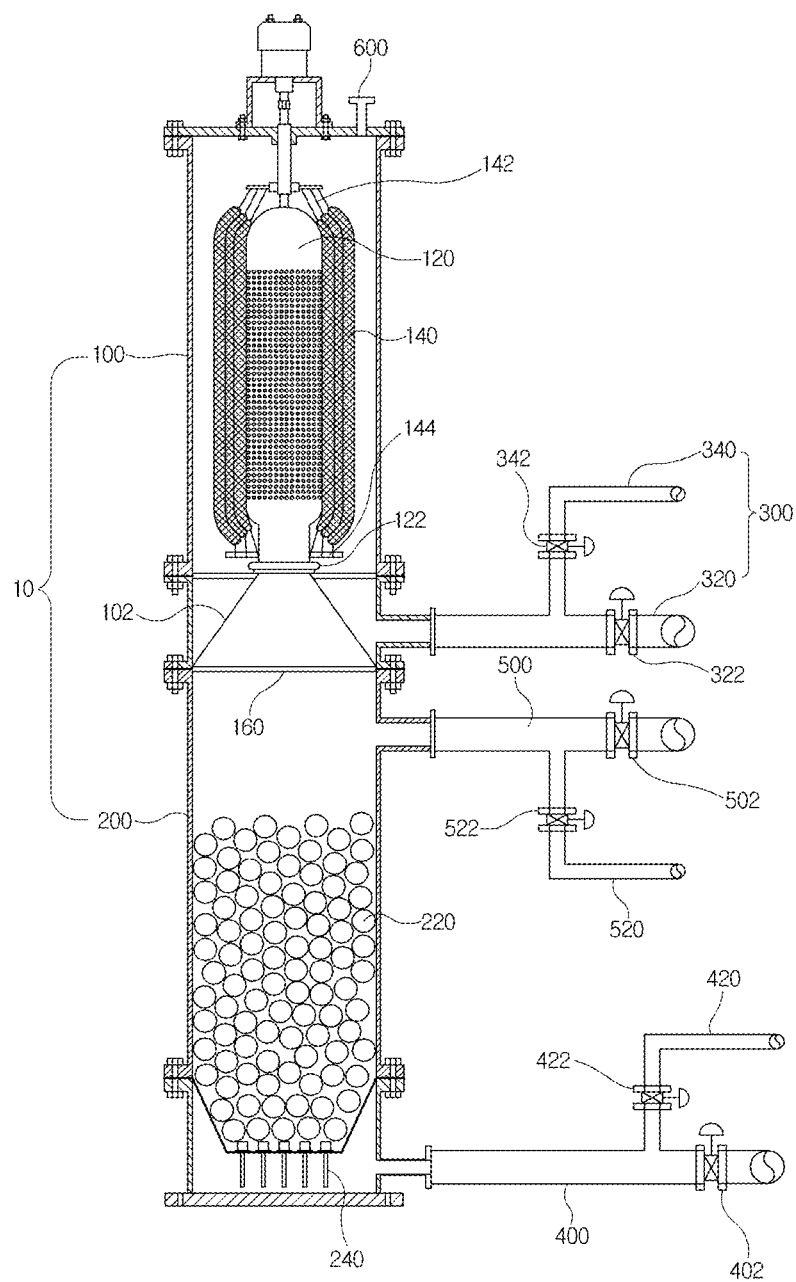

[FIG. 3]
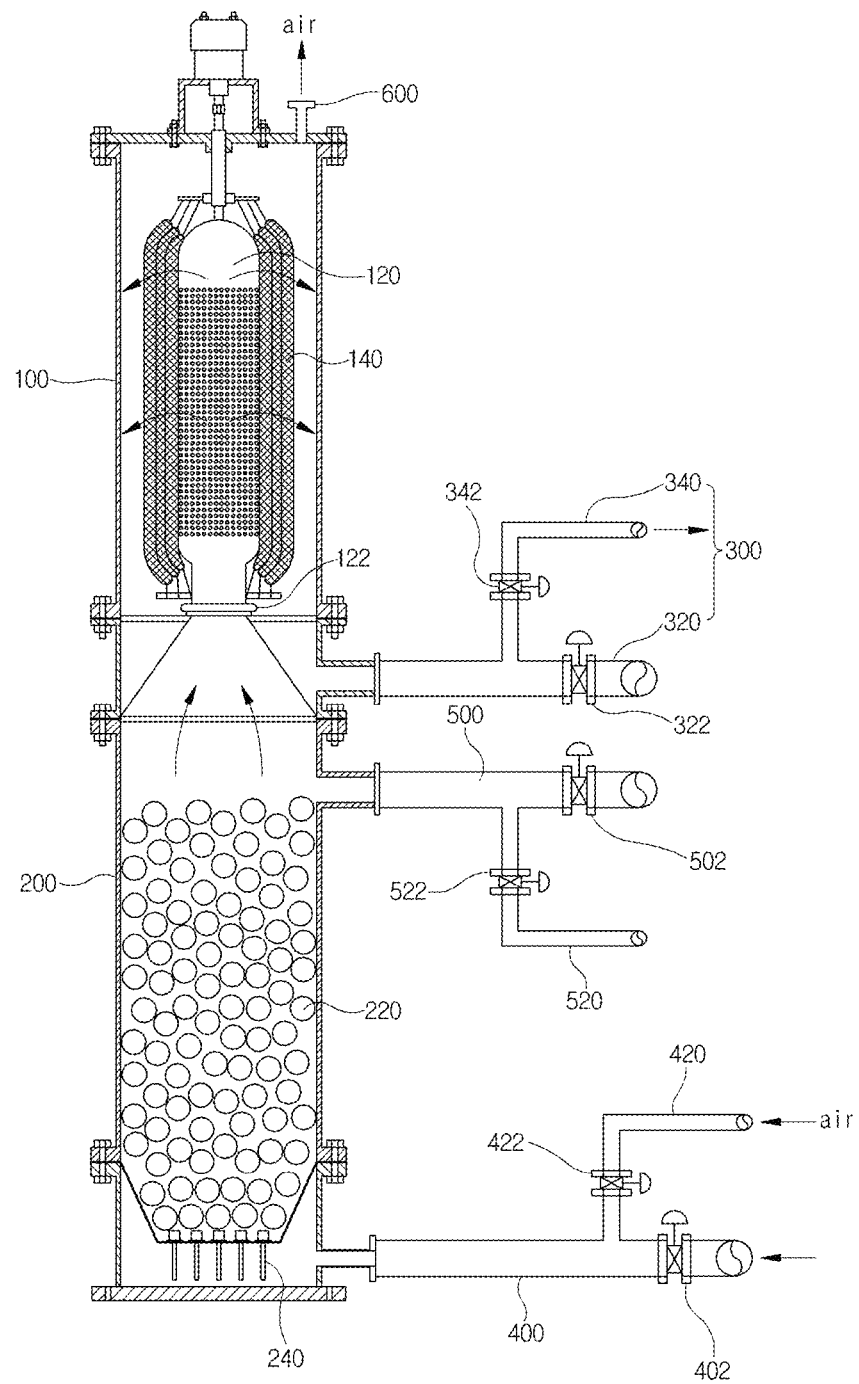

[FIG. 4]
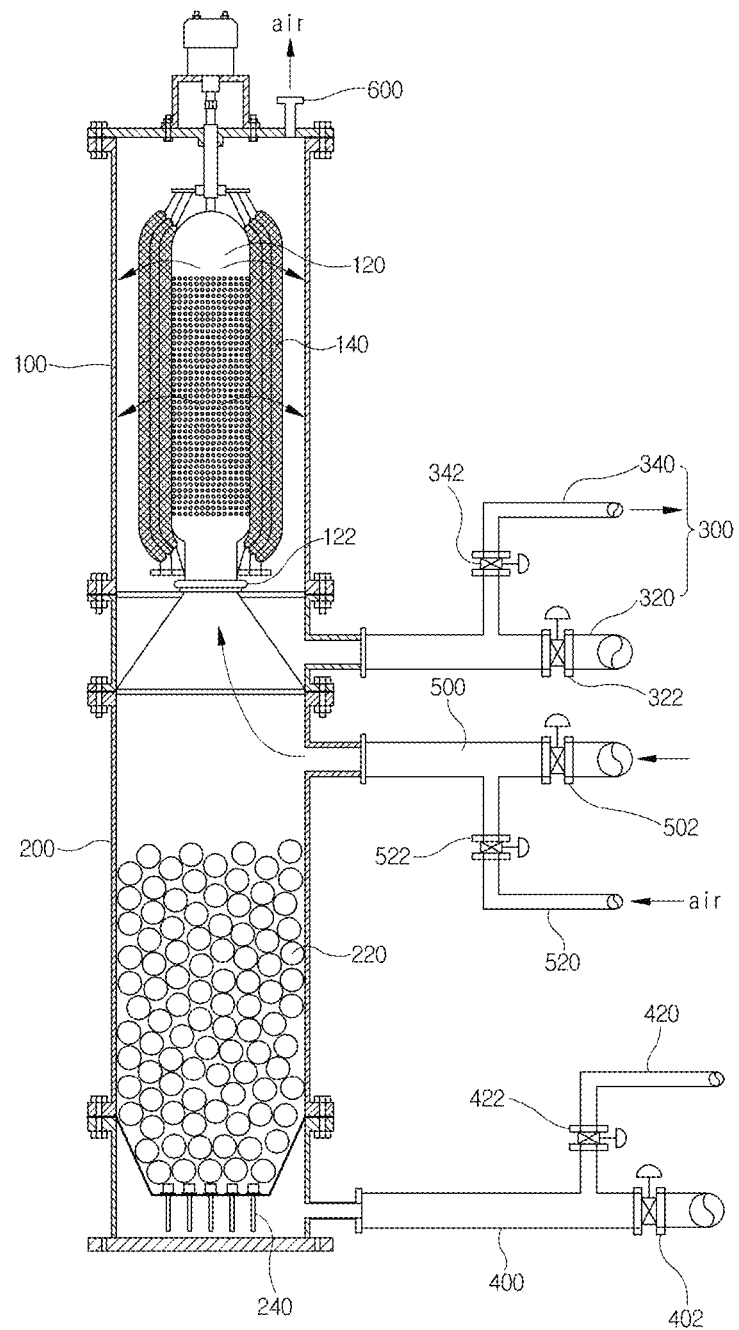

[FIG. 5]
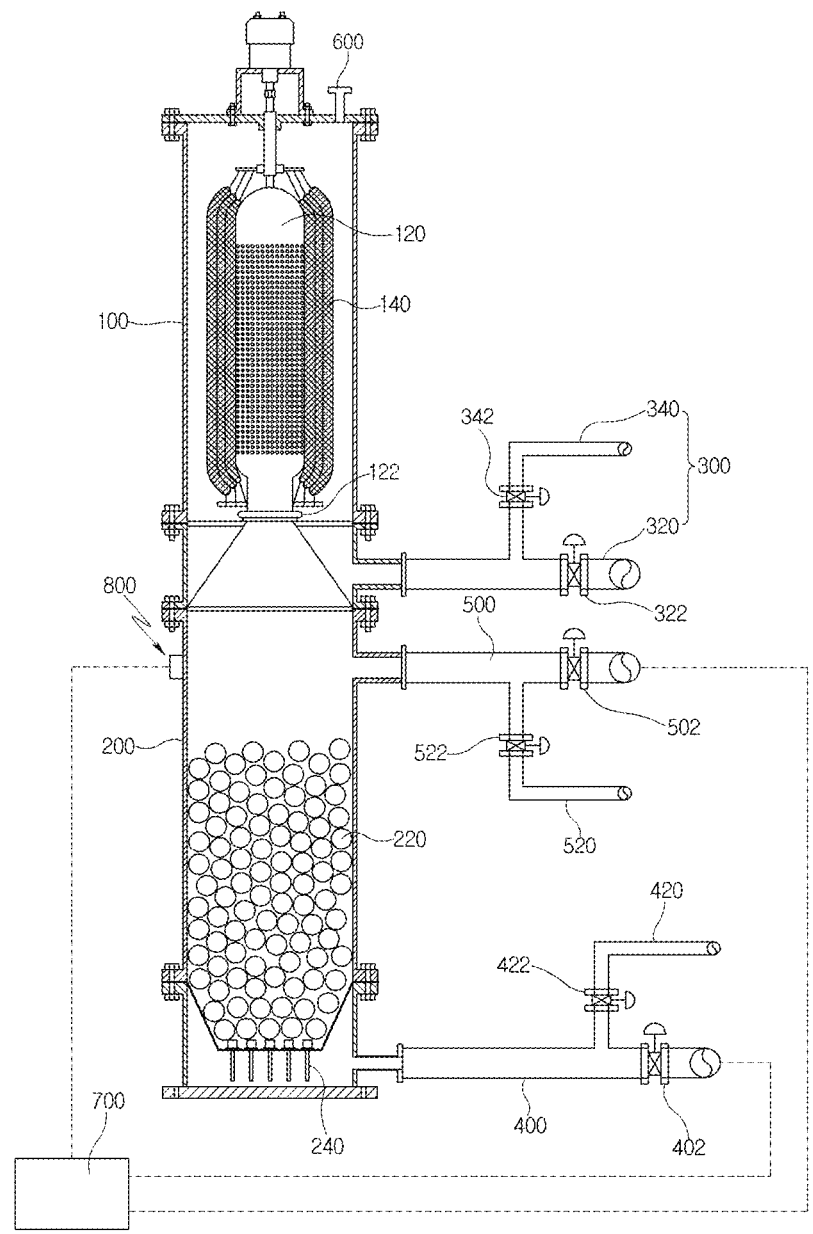

[FIG. 6]
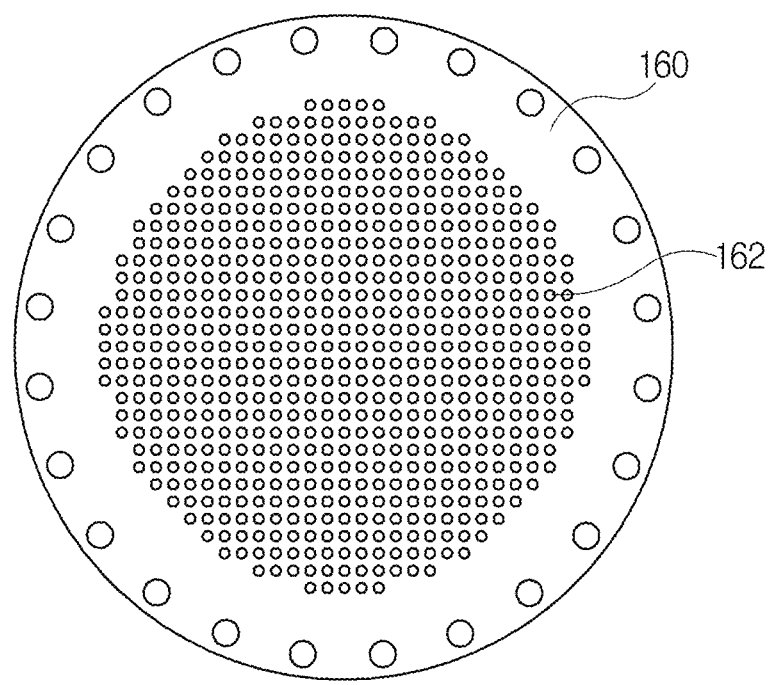

FIBER FILTERING APPARATUS

CROSS-REFERENCE(S) TO RELATED APPLICATIONS

This application is a continuation of PCT Application No. PCT/KR2017/005846, filed Jun. 5, 2017, which claims priority to Korean Patent Application No. 10-2016-0069324, filed on Jun. 3, 2016, the disclosure of each which is incorporated herein by reference in its entirety.

BACKGROUND

The present disclosure relates to a fiber filtering apparatus, and more particularly, to a fiber filtering apparatus capable of suppressing a fiber aggregation phenomenon and improving performance by improving backwash efficiency of a fiber.

Organic and inorganic solids are contained in various domestic sewage, factory waste water, livestock waste water or the like in a suspended state. If such waste water is drained into natural waters such as rivers, lakes, and sea areas without being purified, a turbidity of water is increased and an appearance becomes dirty. Among those, biodegradable organic matter reduce natural water quality by reducing dissolved oxygen or the like.

Therefore, it is preferable that waste water including pollutants such as organic matters, nitrogen, phosphorus, heavy metals, and salt is removed and purified and then drained to a river or a public water body. In particular, water quality in the neighborhood of the city and the river downstream is getting worse due to the increase in population density and the development of industry. Various kinds of filtering apparatuses for purifying the polluted waste water or sewages are being developed.

Generally, a filtration process of city waste water or factory waste water is a process of draining clean treated water from which suspended solids (SS) are removed by introducing raw water containing suspended solids into the filtering apparatus and a process of detaining and trapping the suspended solids in the raw water in pores in the filtering layer of the filtering apparatus and draining only clean water as treated water.

However, if the filtration process is continued, the pores in the filtering layer are gradually filled with the suspended solids and a filtering resistance is increased, such that the filtration process can no longer be continued. A backwashing process for excluding the suspended solids trapped in the pores may be used.

In order to more efficiently perform the backwashing process, a fiber filter is disclosed in Korean Patent Publication No. 10-1386622.

As illustrated in FIG. 1, the fiber filter includes a sewage inlet 20 and a backwashing water outlet 30 that are formed on an upper part of a body 10 and a sewage outlet 40 and a backwashing water inlet 50 that are formed on a lower part of the body 10. In a backwashing step, air is introduced through an air portion 60 as soon as backwashing water is introduced through the backwashing water inlet 50, and the backwashing water subjected to the backwashing process is in a polluted state and is drained through the backwashing water outlet 30 on the upper part of the body.

However, in this fiber filter, since the backwashing water which has been subjected to the backwashing process as described above is drained through the upper part of the body, the backwashing water is not fully-drained, and therefore residue of the backwashing remain in the body.

In addition, if residue is accumulated continuously, the fibers tend to be agglomerated and cracked to deteriorate the performance of the fiber filter, and therefore the fibers have to be frequently replaced.

BRIEF SUMMARY

An object of the present disclosure is to provide a fiber filtering apparatus capable of suppressing a fiber aggregation phenomenon and improving performance by improving backwash efficiency of a fiber.

According to an embodiment, a fiber filtering apparatus includes: an enclosure configured to include an upper box and a lower box communicating with the upper box; a strainer configured to be installed in the upper box along a longitudinal direction; a plurality of fiber yarn media configured to be fixed to upper and lower fixing means each coupled to upper and lower parts of the strainer to form a first filtering layer while surrounding an outer circumferential surface of the strainer; and a plurality of fiber ball media configured to be embedded in the lower box to form a second filtering layer; a first pipe configured to be formed on one side wall on the lower part of the upper box and introduced with raw water during filtration and drain backwashing water during backwashing; and a second pipe configured to be formed on one side wall on a lower part of the lower box and drain filtered water during the filtration and introduced with washing water during the backwashing.

The fiber ball medium may be primarily washed by the washing waster introduced through a second pipe on the lower part of the lower box, and the fiber yarn media may be secondarily washed by the washing water of which the water level rises and then backwashed by a first backwashing mode in which the backwashing water is drained through the first pipe on the lower part of the upper box.

The first pipe may include: a raw water introduction pipe configured to be provided with a raw water introduction control valve regulating an introduced amount of the raw water; and a backwashing water drain pipe configured to be provided with a backwashing water drain control valve regulating a drained amount of the backwashing water.

The fiber filtering apparatus may further include: a first air introduction pipe configured to be connected to one side of the second pipe to introduce air during the backwashing.

A lower surface of the lower box may be formed in a central part formed in a flat plate and an outer part formed in an inclined surface and the central portion may be provided with a plurality of strainer nozzles.

The fiber filtering apparatus may further include: a third pipe configured to be formed on one side wall of an upper part of the lower box and introduced with the washing water during the backwashing.

The fiber filtering apparatus may further include: a second air introduction pipe configured to be connected to one side of the third pipe to introduce air during the backwashing.

The fiber yarn medium may be washed by washing water introduced through the third pipe on the upper part of the lower box, and then backwashed by a second backwashing mode in which the backwashing water is drained through the first pipe on the lower part of the upper box.

The fiber filtering apparatus may further include: an air drain pipe configured to be formed on an upper surface of the upper box to drain air.

The fiber filtering apparatus may further include: a controller configured to selectively supply the washing water to the second pipe or the third pipe according to whether the fiber ball medium needs to be backwashed.

The fiber filtering apparatus may further include: a pollution measuring unit configured to measure how much the fiber ball medium is polluted.

The controller may control the second backwashing mode to perform the backwashing if a pollution level measured by the pollution measuring unit is low, and control the first backwashing mode to perform the backwashing if the pollution level measured by the pollution measuring unit is high.

The pollution measuring unit may measure a pressure in the lower box to measure the pollution level.

A part of the second pipe may be provided with a second pipe control valve for determining a drained amount of the filtered water or an introduced amount of the washing water, and a part of the first air introduction pipe may be provided with the first air introduction control valve for controlling the introduced amount of the air.

A part of the third pipe may be provided with a third pipe control valve for determining the introduced amount of the washing water, and a part of the second air introduction pipe may be provided with the second air introduction control valve for controlling the introduced amount of the air.

The controller may control the first backwashing mode to perform the backwashing by opening the second pipe control valve to introduce the washing water and opening the first air introduction control valve to introduce pressurized air, after the raw water introduction control valve is closed and the backwashing water drain control valve is open.

The controller may control the second backwashing mode to perform the backwashing by opening the third pipe control valve to introduce the washing water and opening the second air introduction control valve to introduce the pressurized air, after the raw water introduction control valve is closed and the backwashing water drain control valve is open.

A distribution plate provided with a plurality of distribution openings may be installed between the upper box and the lower box.

A lower end of the upper box may be provided with a swash plate arriving from a lower end of the strainer to an outer surface of the lower box along a circumferential direction.

A lower part of the strainer may be provided with a backwash nozzle unit, and the backwash nozzle unit may jet the air, which is introduced into the upper part of the lower box through the second air introduction pipe, upwardly.

In an exemplary fiber filtering apparatus of the present disclosure, the backwashing water that has been subjected to the backwashing process is drained through the lower part of the upper box, so that the backwashing water can be completely drained without the residues of the backwashing remaining in the upper box.

The residue of the backwashing may not accumulate to reduce or prevent the agglomeration and cracking phenomenon of the fibers from occurring, such that the performance of the fiber filtering apparatus can be efficiently maintained and the replacement period of the fiber can extend to increase the cost efficiency.

It should be understood that the effects of the present disclosure are not limited to the effects described above.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a schematic diagram showing a backwashing process of a fiber filter;

FIG. 2 is a cross-sectional view of a fiber filtering apparatus according to an embodiment of the present disclosure;

FIG. 3 is a schematic diagram illustrating a first backwashing mode of the fiber filtering apparatus of FIG. 2;

FIG. 4 is a schematic diagram illustrating a second backwashing mode of the fiber filtering apparatus of FIG. 2;

FIG. 5 is a cross-sectional view of a fiber filtering apparatus according to another embodiment of the present disclosure; and FIG. 6 is a diagram illustrating a distribution plate of FIG. 2.

DETAILED DESCRIPTION

Hereinafter, a fiber filtering apparatus according to an exemplary embodiment of the present disclosure will be described with reference to FIGS. 2 to 6.

In the present specification, unless explicitly described to the contrary, "comprising" any components will be understood to imply the inclusion of other components rather than the exclusion of any other elements.

FIG. 2 is a cross-sectional view of a fiber filtering apparatus according to an embodiment of the present disclosure, FIG. 3 is a schematic diagram illustrating a first backwashing mode of the fiber filtering apparatus of FIG. 2, FIG. 4 is a schematic diagram illustrating a second backwashing mode of the fiber filtering apparatus of FIG. 2, FIG. 5 is a cross-sectional view of a fiber filtering apparatus according to another embodiment of the present disclosure, and FIG. 6 is a diagram illustrating a distribution plate of FIG. 2.

In the description of the embodiments, raw water includes a fluid before being introduced into a fiber filtering apparatus for filtration, and filtered water includes a fluid drained from the fiber filtering apparatus in the filtered state.

In addition, washing water includes a fluid that is introduced into the fiber filtering apparatus for backwashing of fibers, and the backwashing water includes a fluid drained from the fiber filtering apparatus after the backwash.

However, the terms are not limited thereto, and the raw water may refer to filtered water, treated water, drain water, or the like according to a movement path or condition, and the backwashing water may also be referred to as washing water, drain water, or the like.

First, a fiber filtering apparatus according to an embodiment of the present disclosure will be described with reference to FIGS. 2 to 4.

The fiber filtering apparatus according to the embodiment of the present disclosure may be configured to largely include an enclosure 10 including an upper box 100 and a lower box 200 communicating with the upper box 100, a strainer 120, a plurality of fiber yarn media 140 forming a first filtering layer, a plurality of fiber ball media 220 forming a second filtering layer, a first pipe 300, a second pipe 400, and a third pipe 500.

The enclosure 10 is formed in a multi-layered structure and includes the lower box 200 installed on a bottom and the upper box 100 installed on an upper part of the lower box 200. The upper box 100 and the lower box 200 may be preferably formed as a cylindrical body and may have the same diameter. Further, the upper box 100 and the lower box 200 communicate with each other and may be integrally formed.

A distribution plate 160 may be installed between the upper box 100 and the lower box 200. A disc—shaped body of the distribution plate 160 is provided with a plurality of distribution openings 162 that may have a uniform size, and filtered water passing through the fiber yarn medium 140 and the strainer 120 may be evenly dispersed and put in the lower box 200.

The strainer 120 is installed inside the upper box 100 along a longitudinal direction, and an upper side of the strainer is closed and a lower side thereof is open. The strainer 120 may preferably be formed in a long cylindrical pipe, and a side wall portion of the strainer 120 may be densely provided with plurality of holes so that air or water may be introduced and drained.

The fiber yarn media 140 are formed on an outer side surface of the strainer 120 along a longitudinal direction to form the first filtering layer. An upper end of the fiber yarn medium 140 is fixed to an upper fixing portion 142 coupled to the upper part of the strainer 120 and a lower end of the fiber yarn medium 140 may be fixed to a lower fixing portion 144 coupled to the lower part of the strainer 120.

The fiber yarn medium 140 may be evenly disposed along a circumferential direction to completely cover the side portions of the strainer 120. Further, to make a filtering path of raw water long, the fiber yarn medium 140 may be formed in multiple plies to make the first filtering layer thick.

The fiber yarn medium 140 is formed in a bundle of fiber yarns, in which materials of the fiber yarn may be flexible materials such as polyester, polypropylene, and polyamide. Further, when ion filtration or the like is required depending on applications, the material of the fiber yarn may also be conductive fiber yarns such as polyethylene and polystyrene.

The fiber yarn medium 140 may be pressed or loosened along a longitudinal direction, and thus an air gap of the fiber yarn medium 140 may be regulated. For this purpose, the upper fixing portion may be installed so as to be movable up and down by a separate driver. That is, if the upper fixing portion moves upward, the fiber yarn medium 140 is pulled to be pressed against the strainer 120 to reduce a size of the air gap, and if the upper fixing portion moves downward, the fiber yarn medium 140 has a reduced tension force to be loosened to increase the size of the air gap.

A backwash nozzle unit 122 may be provided on a lower part of the strainer 120. The backwash nozzle unit 122 may inject air, which is introduced into the upper part of the lower box 200 through a second air introduction pipe 520 to be described later, upward and the air and water injected upward shake the lower part of the fiber yarn medium 140. Accordingly, the fiber yarn medium 140 is rubbed by the backwashing water and the air, and thus may be washed more efficiently.

Meanwhile, a lower end of the upper box 100 may be provided with a swash plate 102 arriving from a lower end of the strainer 120 to an outer surface of the lower box 200 along a circumferential direction so that primary filtered water drained from the strainer 120 is widely dispersed over an outer periphery of the lower box 200 and put therein. That is, the swash plate 102 is formed in a truncated cone when viewed on a sectional view. Accordingly, some of the filtered water passing through the fiber yarn medium 140 may flow along an inner surface of the swash plate 102 and then may be put in the lower box 200 through the distribution plate 160.

The plurality of fiber ball media 220 are provided inside the lower box 200 to form the second filtering layer. The fiber ball medium 220 is a spherical porous filter made of cotton or the like and serves to secondarily filter the primarily filtered water passing through the fiber yarn media 140 and the strainer 120 of the upper box 100. The fiber ball medium 220 may include a rigidly formed core portion and a target portion connected to the core portion to form a thick fiber layer, and may be formed to have a diameter ranging from approximately 10 to 50 mm.

In addition, a lower surface of the lower box 200 includes a central part formed as a flat plate and an outer part formed as an inclined surface, in which the central part may be provided with a plurality of strainer nozzles 240. The strainer nozzle 240 injects air or washing water upward so that the fiber ball media 220 may be mixed with each other. Therefore, when air or water is jetted from the strainer nozzle 240, a circulation flow is formed upward from the central portion and downward from the outer portion, such that the fiber ball media 220 may be evenly washed while being smoothly mixed with each other and a surface layer of the second filtering layer may be arbitrarily located while being mixed with the plurality of fiber ball media 220, thereby effectively keeping the filtration performance for a long period of time.

Next, the structure of the piping for introducing or draining the fluid into or from the fiber filtering apparatus during the filtration operation or the backwashing operation of the fiber filtering apparatus of the present disclosure will be described in detail.

The first pipe 300 into which raw water may be introduced during the filtration and through which the raw water may be drained during the backwashing water is connected to one side of the lower part of the upper box 100.

In an embodiment, the raw water introduced during the filtration may also be polluted raw water which is not filtered, and the backwashing water drained during the backwashing may be in a polluted state after washing the fiber yarn media or the fiber ball media, such that the backwashing water may be collected, through the first pipe during the backwashing, to the place where the raw water may be introduced through the first pipe during the filtration.

In an embodiment, the first pipe 300 is connected to a container in which the raw water is contained during the filtration and the first pipe 300 is connected to the container through which the backwashing water is drained during the backwashing, such that different containers may be connected during the filtration operation and the backwashing operation, respectively.

With reference to FIGS. 2 to 4, the first pipe 300 includes a raw water introduction pipe 320 provided with a raw water introduction control valve 322 to regulate an introduced amount of raw water, and a backwashing water drain pipe 340 provided with a backwashing water drain control valve 342 to regulate a drained amount of backwashing water. A place into which the raw water is introduced during the filtration and a place where the raw water may be drained during the backwashing may be separated from each other, the introduced amount of the raw water may be regulated by the raw water introduction control valve 322 to reduce or prevent the raw water from being introduced during the backwashing, and the drained amount of the backwashing water may be regulated by the backwashing water drain control valve 342 to reduce or prevent the fluid in the upper box 100 from being drained during the filtration. This will be described in the following operation process.

The second pipe 400 into which the backwashing water may be introduced during the backwashing and through which the filtered water may be drained during the filtration is connected to one side of the low part of the lower box 200. A part of the second pipe 400 may be provided with a second pipe control valve 402 to determine the drained amount of the filtered water or the introduced amount of the washing water.

Further, a first air introduction pipe 420 connected to one side of the lower part of the lower box 200 or one side of the second pipe 400 to introduce air during backwashing may be formed. A part of the first air introduction pipe 420 may be provided with a first air introduction control valve 422 to regulate the introduced amount of air.

In addition, the upper surface of the upper box 100 may be provided with an air drain pipe 600 for draining air. Accordingly, the air introduced during the backwashing may be easily drained through the air drain pipe 600 at the top.

In the fiber filtering apparatus of the present disclosure, the fiber ball media 220 may be primarily washed by the washing water introduced through the second pipe 400 on the lower part of the lower box 200 and the fiber yarn medium 140 is secondarily washed by the washing water of which the water level rises and then may be backwashed by a first backwashing mode in which the backwashing water is drained through the first pipe 300 on the lower part of the upper box 100.

The backwashing operation by the first backwashing mode will be described in detail with reference to FIG. 3.

The raw water introduction control valve 322 is closed and the backwashing water drain control valve 342 is open, and the washing water is introduced through the second pipe 400. At the same time, pressurized air may be introduced through the first air introduction pipe 420, and the washing water and air wash the fiber ball media 220 while being jetted upward through the strainer nozzle 240. A stream of current jetted through the strainer nozzle 240 forms a circulation flow that flows upward from the central part of the lower surface of the lower box 200 to be downward to the outer part, such that the fiber ball media 220 may be evenly washed while being mixed with each other.

The washing water moves to the upper box 100 since the inside of the lower box 200 is filled with water introduced into the strainer 120 and thus washes the fiber yarn media 140 while being drained to the outside through the holes.

The backwashing water washing up to the fiber yarn media 140 is drained through a backwashing water drain pipe 340 formed at the lower side of the upper box 100. In this way, the backwashing water that has been subjected to the backwashing process is drained through the lower part of the upper box, such that the backwashing water can be completely drained without the residues of the backwashing remaining in the upper box.

A third pipe 500 through which the washing water is introduced may be connected to one side of the upper part of the lower box 200. A part of the third pipe 500 may be provided with a third pipe control valve 502 to determine how much the washing water is introduced.

Further, the second air introduction pipe 520 connected to one side of the upper part of the lower box 200 or one side of the third pipe 500 to introduce air during backwashing may be formed. A part of the second air introduction pipe 520 may be provided with a second air introduction control valve 522 to regulate the introduced amount of air.

In the fiber filtering apparatus of the present disclosure, in addition to the first backwashing mode, the fiber yarn media 140 are washed by the washing water introduced through the third pipe 500 on the upper part of the lower box 200 and then may be backwashed by the second backwashing mode in which the backwashing water is drained through the first pipe 300 on the lower part of the upper box 100.

The backwashing operation by the second backwashing mode will be described in detail with reference to FIG. 4.

The raw water introduction control valve 322 is closed and the backwashing water drain control valve 342 is open, and the washing water is introduced through the third pipe 500. At the same time, the pressurized air may be introduced through the second air introduction pipe 520, and the air is jetted upward of the upper box through the backwash nozzle unit 122. The air which is jetted upward shakes the lower part of the fiber yarn media 140 to help the washing process to be more efficiently performed.

The washing water introduced through the third pipe 500 also washes the fiber yarn media 140 while flowing upward and then is drained through the backwashing drain pipe 340 formed on one side of the lower part of the upper box 100.

In this way, the backwashing water that has been subjected to the backwashing process is drained through the lower part of the upper box, such that the backwashing water may be completely drained without the residue of the backwashing remaining in the upper box and the washing of the fiber yarn media 140 may be effectively performed, thereby improving the filtration performance and extending the lifespan.

As illustrated in FIG. 5, the fiber filtering apparatus according to another embodiment of the present disclosure may further include a controller 700 that selectively supplies the washing water to the second pipe 400 or the third pipe 500 according to whether the fiber ball media 220 needs to be backwashed.

Generally, pollutants are more weakly attached to and accumulated in the fiber ball media 220 that may be secondarily filtered and mixed with each other, compared to the fiber yarn media 140 that is primarily filtered.

Therefore, if the fiber yarn media 140 needs to be backwashed but the fiber ball media 220 need not be backwashed, the backwashing operation is performed according to the second backwashing mode, such that time and costs may be saved.

Further, the fiber filtering apparatus may further include a pollution measuring unit 800 to measure how much the fiber ball media 220 are polluted. The pollution measuring unit 800 may measure how much the fiber ball media 220 are polluted by various methods. In the present embodiment, the pollution measuring unit 800 measures how much the fiber ball media 220 are polluted by measuring the pressure inside the lower box 200.

If the pollutants are attached to and accumulated in the fiber ball media 220 by the filtration, the primary filtered water introduced from the upper box 100 to the lower box 200 may not be filtered through the fiber ball media 220 as it is, and therefore the pressure in the lower box 200 is increased.

Accordingly, depending on the pollution level measured by the pollution measuring unit 800, the controller 700 may control the second backwashing mode to perform the backwashing if the pollution level is low and the first backwashing mode to perform the backwashing if the pollution level is high.

Specifically, upon controlling the first backwashing mode to perform the backwashing, after the raw water introduction control valve 322 is closed and the backwashing drain control valve 342 is open, it is possible to perform the control to introduce the washing water through the second pipe 400 and at the same time to introduce the pressurized air through the first air introduction pipe 420.

In addition, upon controlling the second backwashing mode to perform the backwashing, after the raw water introduction control valve 322 is closed and the backwashing drain control valve 342 is open, it is possible to perform the control to introduce the washing water through the third pipe 500 and at the same time to introduce the pressurized air through the second air introduction pipe 520.

Although the preferred embodiments have been disclosed for illustrative purposes, those skilled in the art will appreciate that various modifications, additions and substitutions are possible, without departing from the scope and spirit of the accompanying claims and their equivalents. Furthermore, the above advantages and features are provided in described embodiments, but shall not limit the application of such issued claims to processes and structures accomplishing any or all of the above advantages.

What is claimed is:

1. A fiber filtering apparatus, comprising:
   an enclosure that includes an upper box and a lower box in communication with the upper box;
   a strainer disposed in the upper box and extending in a longitudinal direction;
   a plurality of fiber yarn media operable to be respectively fixed to upper and lower fixing portions, the upper and lower fixing portions respectively coupled to upper and lower parts of the strainer to form a first filtering layer;
   a plurality of fiber ball media operable to be disposed in the lower box to form a second filtering layer;
   a first pipe coupled to a sidewall of a lower part of the upper box operable to receive raw water from source of raw water through a raw water introduction pipe during filtration and drain backwashing water through a backwashing water drain pipe during backwashing;
   a second pipe coupled to a sidewall of a lower part of the lower box operable to drain filtered water during the filtration and receive washing water from source of washing water during the backwashing: and
   a third pipe coupled to a side wall of an upper part of the lower box and operable to receive the washing water from the source of washing water during the backwashing.

2. The fiber filtering apparatus of claim 1, wherein
   the second pipe is operable to receive washing water from the source of washing water that primarily washes the fiber ball medium and secondarily washes the fiber yarn media as a water level in the enclosure rises, and
   the backwashing water drain pipe of the first pipe is operable to drain the backwashing water to backwash the fiber ball medium in a first backwashing mode.

3. The fiber filtering apparatus of claim 2, wherein the first pipe includes:
   the raw water introduction pipe coupled with a raw water introduction control valve that is operable to regulate an amount of the raw water that is introduced into the raw water introduction pipe from the source of raw water; and
   the backwashing water drain pipe coupled with a backwashing water drain control valve that is operable to regulate a drained amount of the backwashing water received from the source of washing water through the second pipe.

4. The fiber filtering apparatus of claim 3, further comprising a first air introduction pipe coupled to a side of the second pipe and operable to introduce air from source of pressurized air during the backwashing.

5. The fiber filtering apparatus of claim 4, wherein
   a lower surface of the lower box includes a flat plate portion that includes a plurality of strainer nozzles and an outer portion having an inclined surface.

6. The fiber filtering apparatus of claim 5, further comprising a second air introduction pipe coupled to a side of the third pipe and operable to introduce air from the source of pressurized air during the backwashing.

7. The fiber filtering apparatus of claim 6, wherein
   the third pipe is operable to receive the washing water that washes the fiber yarn medium, and
   the first pipe is operable to drain the backwashing water that backwashed the fiber yarn medium in a second backwashing mode.

8. The fiber filtering apparatus of claim 7, further comprising an air drain pipe coupled to an upper surface of the upper box and operable to drain air introduced during the backwash.

9. The fiber filtering apparatus of claim 7, further comprising a controller configured to selectively supply the washing water received from the source of washing water to the second pipe or the third pipe based on a pollution level of the fiber ball medium.

10. The fiber filtering apparatus of claim 9, further comprising a pollution measuring unit configured to measure the pollution level of the fiber ball medium.

11. The fiber filtering apparatus of claim 10, wherein the controller is configured to control the second backwashing mode to perform the backwashing if the pollution level measured by the pollution measuring unit is low, and to control the first backwashing mode to perform the backwashing if the pollution level measured by the pollution measuring unit is high.

12. The fiber filtering apparatus of claim 10, wherein the pollution measuring unit is configured to measure a pressure in the lower box to measure the pollution level.

13. The fiber filtering apparatus of claim 9, wherein
   the second pipe is coupled with a second pipe control valve operable to control a drained amount of the filtered water or an introduced amount of the washing water, and
   the first air introduction pipe is coupled with a first air introduction control valve operable to control an amount of the introduced air.

14. The fiber filtering apparatus of claim 13, wherein
   the third pipe is coupled with a third pipe control valve operable to control the introduced amount of the washing water, and
   the second air introduction pipe is coupled with a second air introduction control valve operable to control the amount of the introduced air.

15. The fiber filtering apparatus of claim 14, wherein the controller is configured to control the first backwashing mode to perform the backwashing by opening the second pipe control valve to introduce the washing water and opening the first air introduction control valve to introduce pressurized air, after the raw water introduction control valve is closed and the backwashing water drain control valve is open.

16. The fiber filtering apparatus of claim 15, wherein the controller is configured to control the second backwashing mode to perform the backwashing by opening the third pipe control valve to introduce the washing water and opening the second air introduction control valve to introduce the pressurized air, after the raw water introduction control valve is closed and the backwashing water drain control valve is open.

17. The fiber filtering apparatus of claim 7, wherein the lower part of the strainer includes a backwash nozzle unit, and the backwash nozzle unit is operable to inject air, which is introduced into an upper part of the lower box through the second air introduction pipe, upwardly, so that the fiber yarn medium is rubbed by the backwashing water and the air injected upwardly.

18. The fiber filtering apparatus of claim 1, wherein a distribution plate that includes a plurality of distribution openings is disposed between the upper box and the lower box.

19. The fiber filtering apparatus of claim 1, wherein a lower end of the upper box is provided with a swash plate arriving from a lower end of the strainer to an outer surface of the lower box along a circumferential direction.

\* \* \* \* \*